United States Patent [19]
Topper et al.

[11] Patent Number: 5,255,093
[45] Date of Patent: Oct. 19, 1993

[54] APPARATUS AND A METHOD FOR LIMITING GAIN IN A DIGITAL GAMMA CORRECTOR

[75] Inventors: Robert J. Topper, Hatboro, Pa.; Lee R. Dischert, Medford, N.J.

[73] Assignee: Panasonic Technologies, Inc., Secaucus, N.J.

[21] Appl. No.: 901,372

[22] Filed: Jun. 19, 1992

[51] Int. Cl.$^5$ .............................................. H04N 5/202
[52] U.S. Cl. ...................................... 358/164; 358/32
[58] Field of Search .......................... 358/32, 164, 160

[56] References Cited

U.S. PATENT DOCUMENTS

| | | | |
|---|---|---|---|
| 4,799,106 | 1/1989 | Moore et al. | 358/164 |
| 4,805,013 | 2/1989 | Dei et al. | 358/164 |
| 5,132,796 | 7/1992 | Topper et al. | 358/164 |

Primary Examiner—Victor R. Kostak
Assistant Examiner—Chris Grant
Attorney, Agent, or Firm—Ratner & Prestia

[57] ABSTRACT

A method and apparatus for reducing the maximum gain applied to a video signal during gamma correction are disclosed. A gamma exponent value, a black level, white level, and a desired maximum gain value are selected. A count of possible input signal values is determined. A modified black level is set equal to the desired black level. A gain limit value for the gamma correcting transfer function is calculated, and the smallest input signal for which the applied gain is less than or equal to the gain limit is determined. A black level correction factor is calculated. The modified black level is increased by the black level correction factor, and a determination is made whether the black level correction factor has decreased to less than a predetermined threshold value. The gamma correction function is re-calculated and further black level corrections are added until the correction threshold is reached. The final transfer function increases linearly and has a gain equal to the gain limit value for video signal values near the desired black level. The gamma function increases non-linearly at a decreasing rate near the white level.

8 Claims, 6 Drawing Sheets

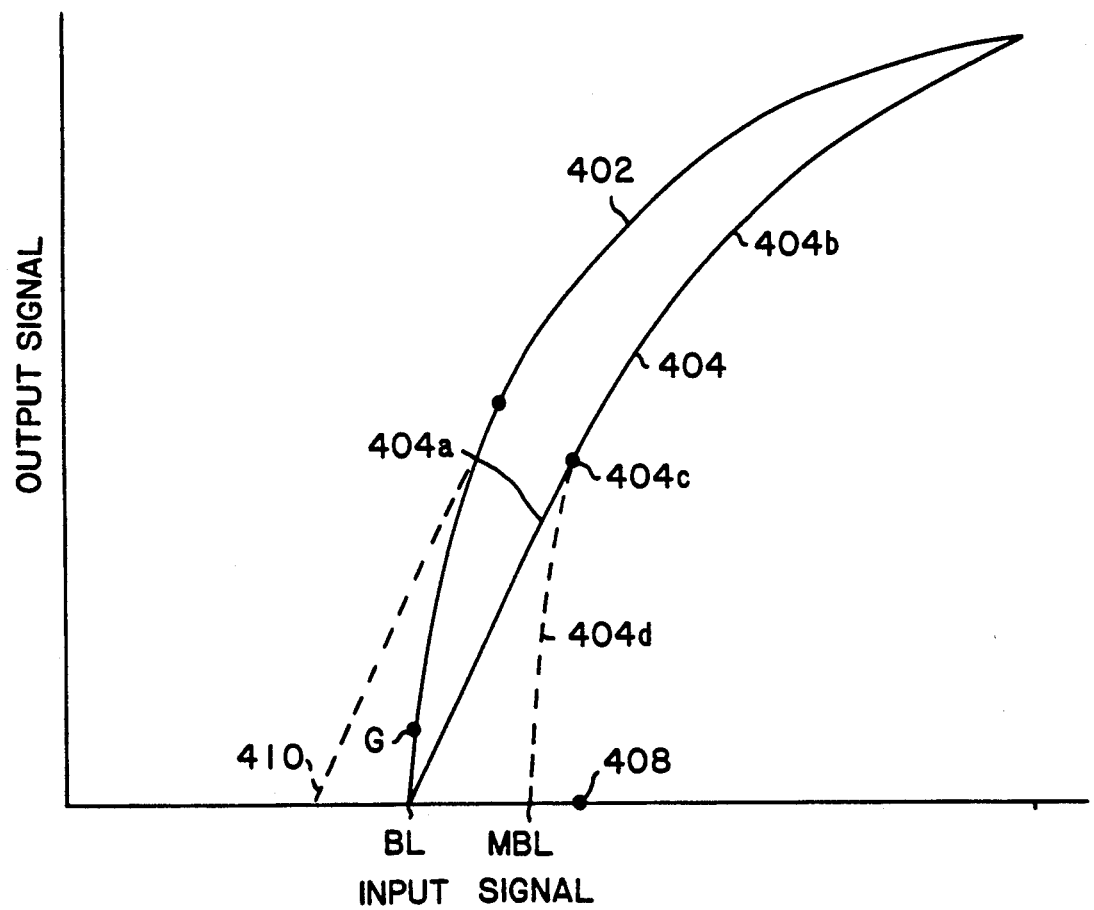

APPARATUS AND A METHOD FOR LIMITING GAIN IN A DIGITAL GAMMA CORRECTOR

BACKGROUND OF THE INVENTION

1. Field of the Invention

The present invention relates to the field of television camera design, and in particular to the use of digital circuitry to perform amplitude transfer characteristic (gamma) correction.

2. Description of the Prior Art

One step in the alignment of a television camera is to perform proper gamma correction. Gamma correction is intended to create visual color match, under conditions of equal color temperature and luminance, between the original scene and its reproduction on a color picture tube. Since the phosphors in a conventional picture tube do not respond linearly to different voltage levels, gamma correction is performed by applying a non-linear transfer function to the video signal prior to transmission or recording. These transfer functions in cameras are typically used not only to implement gamma correction, but also to establish black level and white level which are independent of gamma correction. The usual form for this transfer function is shown in equation (1).

$$V = C * X^{gamma} \quad (1)$$

where:

V = Output voltage after gamma correction;
X = Input light level such that Black level $\leq$ X $\leq$ White level;
gamma = An exponent, typically about 0.45; and
C = A constant Digital gamma correctors have been built which operate in accordance with equation (1). While this approach is mathematically correct, it tends to produce quantization artifacts, particularly near the black level. A transfer function which follows equation (1) may have a gain near the black level of approximately 20. For a typical digital gamma corrector, the input signal quantization levels are evenly spaced in the range between the black level and the white level. A small number of input quantization levels near the black level correspond to a large range of output values. Consequently, comparatively small changes in incoming light level may result in relatively large steps in the gamma corrected signal. This results in sampling artifacts which may enhance signal noise causing dark areas of the reproduced image to appear speckled or to have exaggerated textures.

Gamma correction in video cameras generally deviates from equation (1) to provide greater detail in low-light areas, as noted in a textbook by Benson et al. entitled "HDTV Advanced Television for the 1990s", McGraw Hill Publishing CO., (1991), at page 10.4. For example, the Society of Motion Picture and Television Engineers SMPTE 240M standard for Television Signal Parameters 1125/60 specifies the following transfer characteristic for use in 1125/60 high definition television systems:

$$V = 1.1115 \, X^{0.45} - 0.1115 \, X \leq 0.0228 \quad (2b)$$

$$V = 4.0 * X \; X > 0.0228 \quad (2b)$$

Benson et al., at page 10.10, discuss a method of dynamic range extension to enhance detail at the edge of the signal range. In particular, Benson et al. discuss the importance of capturing detail beyond normal peak white. One known method is by means of highlight-compression circuits. Rather than sharply clipping all signals above reference white, gain-reduction electronic circuits operating on levels several times the reference white level compress the higher level signals so that they fall within the range. The circuits employ a piecewise linear transfer function in which the gain is substantially lower above a knee.

In order to perform well with widely varying light levels, it is desirable to be able to independently adjust the black level and white level. As the gamma value increases, however, the slope of the transfer function for input signal values near the black level also increases. Increased gain in the gamma curve tends to increase the visibility of noise in the reproduced image.

SUMMARY OF THE INVENTION

The present invention is embodied in an apparatus and method for reducing the maximum gain applied to a video signal during gamma correction. The gamma exponent value, desired black level, desired white level and desired maximum gain value are selected and the number of quantization levels for possible input signal values is determined. A modified black level is set equal to the desired black level. A gain limit value is calculated from the desired maximum gamma gain value entered by the operator, the desired black level, desired white level, desired maximum gain value and the number of quantization levels.

A selected input signal value is calculated, for which the applied gain is equal to the gain limit value. A selected output signal value is also calculated, which is the gamma curve value corresponding to the selected input signal value. A black level correction factor is calculated from the desired black level, the selected input signal value, selected output signal value and the gain limit value. The modified black level is increased by the black level correction factor. The modified black level is then used to generate the non-linear portion of the gain limited gamma curve.

The steps of determining the selected input signal value, the black level correction factor, and modifying the black level are repeated until the black level correction factor decreases to a value less than a predetermined threshold value. A transfer function curve is generated which increases linearly for video signal values between the desired black level and the selected input signal value, with video signal gain equal to the reduced gain value. Between the selected input signal value and the desired white level, the transfer function increases at a decreasing rate, according to a power function. The transfer function is applied to video signals to produce gamma corrected video signals having the specified white level and black level with visually attenuated noise and substantially reduced noise in darker portions of the image.

BRIEF DESCRIPTION OF THE DRAWINGS

FIG. 4 is a graph of signal amplitude versus signal amplitude which shows a gamma curve generated using the invention.

DESCRIPTION OF THE INVENTION

Overview

The present invention is embodied in apparatus and a method for reducing the maximum gain applied to a video signal during gamma correction, thus reducing the visibility of noise in dark areas of the reproduced image.

During camera alignment, a gamma exponent value, a desired black level, a desired white level and a desired maximum gain G are selected by an operator input. A gain limited gamma curve is then generated through an iterative process, the gain limited curve having the same black and white level values as input by the operator. The gain limited curve is linear for input signal values below a selected input signal value, calculated by the circuitry. The gain in this region is substantially reduced from the maximum gain which would be obtained if a power-curve based gamma curve is used. The gain limited curve is non-linear for input signal values above the selected input signal value.

The apparatus includes dedicated circuit components for performing the iterative gamma curve calculations. A microprocessor controls the apparatus and performs additional, less frequently performed, calculations.

DETAILED DESCRIPTION

Figure 1:
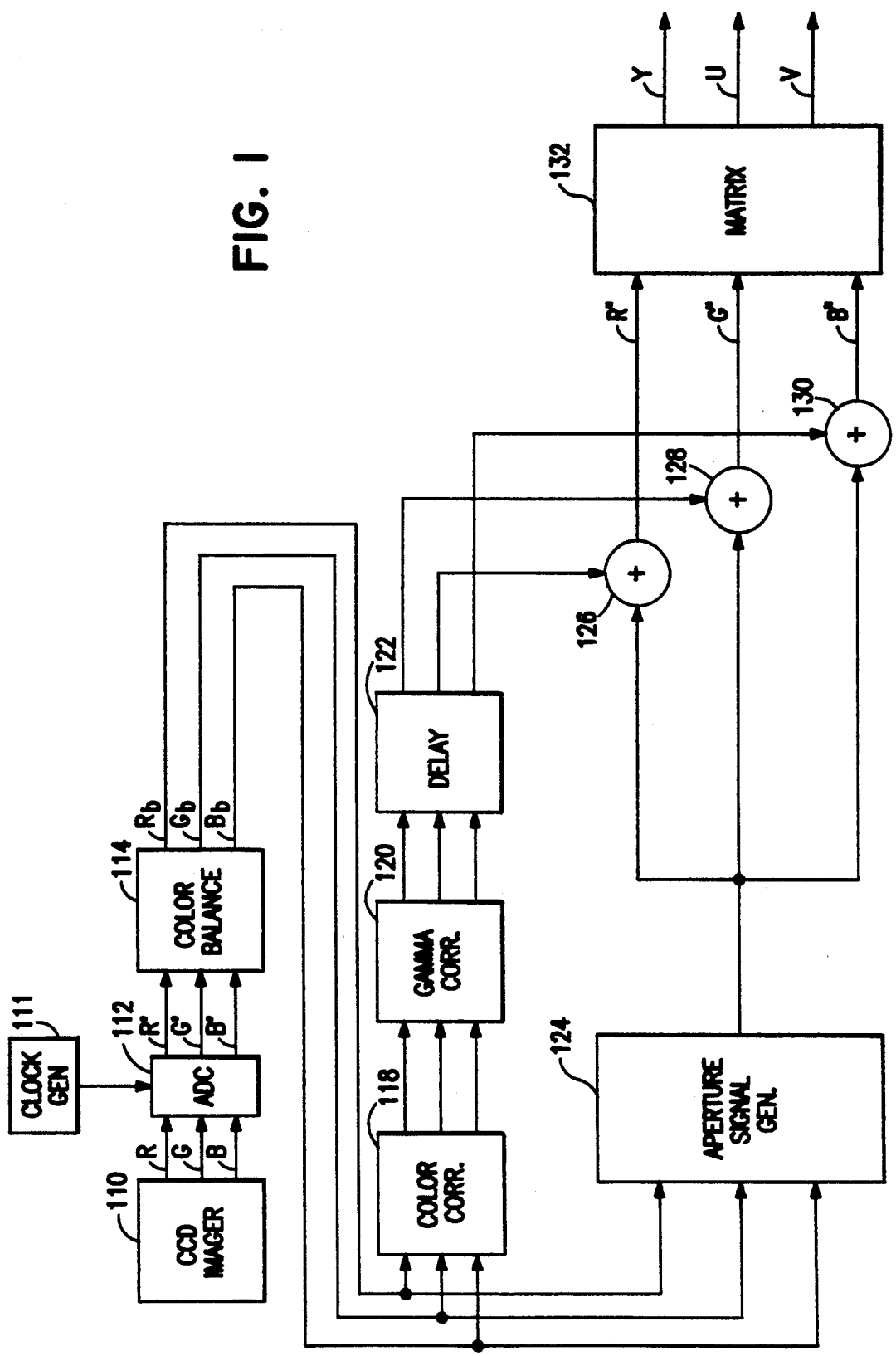
FIG. 1 is a block diagram of an exemplary color television camera which includes an embodiment of the present invention.

In the exemplary camera shown in FIG. 1, a CCD imager 110 provides red (R), green (G) and blue (B) signals representing a color image. The CCD imager 110 may include, for example, a conventional CCD matrix having an integral color filter mosaic and circuitry which processes the signals provided by the CCD matrix to generate separate red, green and blue color signal components. Alternatively, the camera may include three independent CCD sensors which receive light of three respectively different colors via a prism. In this configuration, each sensor produces a respectively different one of the red, green and blue signals.

The analog red, green and blue signals provided by the CCD imager 110, are applied to analog-to-digital converter (ADC) 112 which generates respective digitally sampled red R', green G' and blue B' color signals synchronous with a clock signal, CLOCK, provided by a clock signal generator 111. The digitized color signals provided by the ADC 112 are applied to color-balance circuitry 114. Circuitry 114 automatically adjusts amplification factors applied to the respective digital signals so that the brightest object in the camera's field of view will appear white on the reproduced image. The color-balance calibration is performed once during the initial camera set-up. The gain factors developed in this calibration step, however, are applied to the R', G' and B' signals provided by the ADC 112 during the remainder of normal imaging operation. If a signal exceeds the maximum amplitude value which can be represented by a digital signal value, for example, 255 for an 8-bit digital sample, the color-balance circuit 114 limits the value of that signal to the maximum digital value.

Red, green and blue color signals ($R_b$, $G_b$ and $B_b$) provided by the color balance circuit 114 are applied in parallel to color correction circuitry 118 and aperture signal generator 124. The color correction circuitry 118 may, for example, process the color signals $R_b$, $G_b$ and $B_b$ provided by the circuitry 114 to generate color-shifted red, green and blue signals which produce correct image hues on a target image-device. The circuitry 118 effectively converts the colors passed by the color filters used in the CCD imager 110 into signals which will reproduce the image colors correctly under a target video standard (e.g. NTSC, PAL or SECAM).

The corrected color signals provided by the circuitry 118 are applied to gamma correction circuitry 120. The gamma correction circuitry is discussed in detail below with reference to FIGS. 2 through 5.

The output signals provided by the gamma correction circuitry 120 are delayed through a delay element 122, which compensates for signal processing delays through the aperture signal generator 124, and are then applied to respective adders 126, 128 and 130. The other input signal to each of the adders 126, 128 and 130 is a peaking signal generated by the aperture signal generator 124. This peaking signal is a high-frequency signal which is added to all of the component color signals. The effect of this operation is to emphasize high-frequency components in the image signal relative to low-frequency components. Since this signal is added to each of the red, green and blue color signals, it acts to emphasize the high-frequency components as a monochrome signal. That is to say, the effect it produces is visible mainly in the luminance signal, Y, produced by the camera.

The output signals (R", G" and B") of the adders 126, 128 and 130 may, for example, be applied to a matrix 132 which generates the luminance signal, Y, and two color difference signals, for example, U and V, from the three primary color signals R", G" and B".

Figure 2:
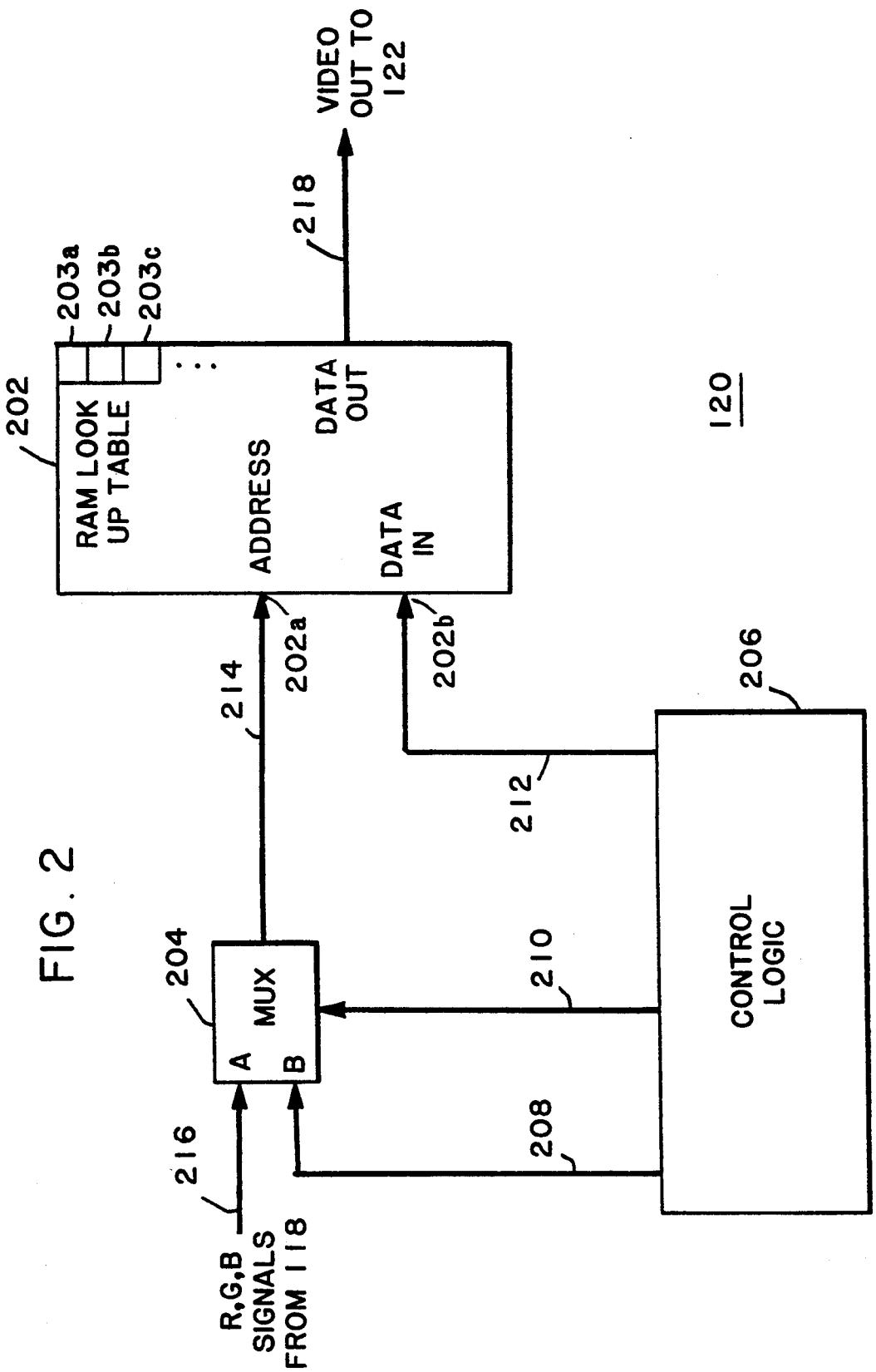
FIG. 2 is a block diagram of gamma correction circuitry suitable for use in the camera shown in FIG. 1.

FIG. 2 shows an exemplary embodiment of the gain limiting gamma correction circuitry 120 in greater detail. Gamma correction circuitry 120 applies a gain limited gamma transfer function to the corrected red, green and blue color video signals to provide signals which generate proper gray-scale images under a target video standard (e.g. NTSC, PAL or SECAM).

Gamma correction information is stored in the random access memory (RAM) look-up table (LUT) 202. For a digital video signal 214 with N bits of quantization, LUT 202 includes $2^N$ memory locations $203_{(a)}$–$203_{(n)}$ (one per grey scale level). For example, for an 8-bit input sample, there are 255 values in the LUT 202. The LUT 202 uses the value of the video signal 214 as the address at which the corresponding output signal value is stored.

Each memory location $203_{(a)}$–$203_{(n)}$ stores an output signal value which equals the gamma corrected signal value for the input signal value by which the location is addressed.

A multiplexer 204 receives data from two separate channels 208, 216 for respectively filling LUT 202, and providing video input signals 214 to the LUT. The control logic 206 provides a selection signal 210 to select one of the channels as the output signal of multiplexer 204. When the video input signal 214 is selected, LUT 202 receives video input signal 214 at its address port and provides the stored gamma corrected value from the address corresponding to the value of input signal 214. This gamma corrected value is provided as an output video signal 218.

When the filling channel 208 is selected, the control logic 206 provides an address signal 208 which passes through multiplexer 204, to the address port 202a of the LUT 202. As each address signal value is passed to the LUT 202, the control logic 206 also provides a data value to the data port 202b of LUT 202. The data value is one of the $2^N$ grey scale levels and is stored as the transfer function value at the address indicated by the address signal.

The control logic 206 fills the LUT 202 during the television camera alignment, and controls multiplexer 204. After alignment, the control logic 206 configures the multiplexer 204, by signal 210, to provide input signal data 214 to LUT 202. The LUT 202 provides the gamma corrected values for the signals $R_b$, $G_b$ and $B_b$ to the delay circuitry 122 according to the stored transfer function. The control logic 206 may be implemented as dedicated processing hardware, a software directed microprocessor system, or a combination of the two. FIG. 3 shows an exemplary embodiment of the control logic using a microprocessor plus dedicated hardware components.

Figure 3A:
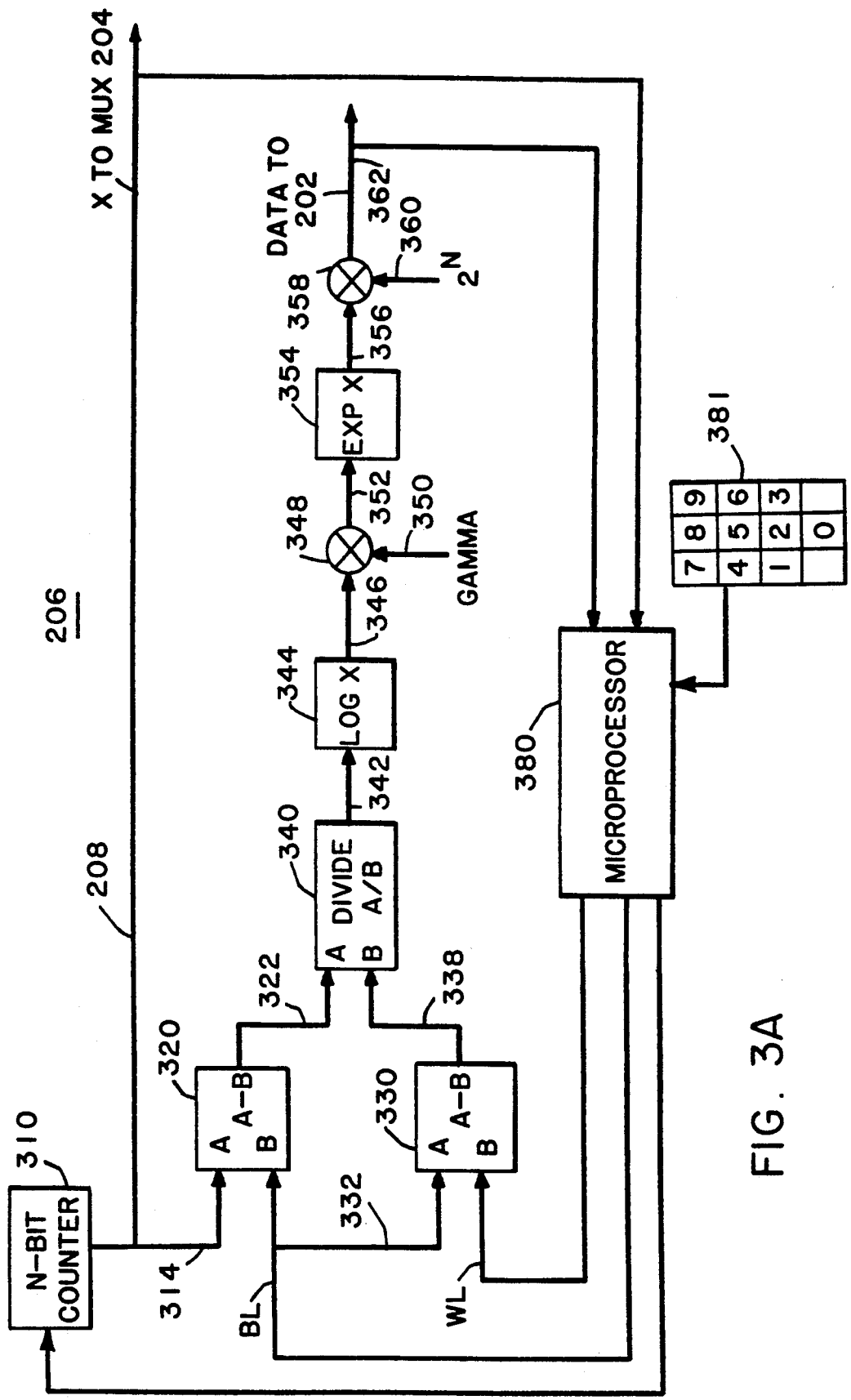
FIG. 3a is a block diagram of an exemplary circuit suitable for use within the control logic circuit shown in FIG. 2.

The hardware components in FIG. 3A are dedicated to the functions of generating and modifying the values of the transfer function in the non-linear region. Voltage signals representative of the desired black level BL, desired white level WL, gamma 350, desired maximum gain value G and the number of quantization levels $2^N$ (a count of the possible input signal values) are provided to the dedicated hardware. These signals may be generated by the microprocessor 380, based on data provided by an operator via input device 381.

In FIG. 3A, an N-bit counter 310 generates successive addresses X, which are provided to the multiplexer 204, the microprocessor 380, and a subtractor 320. The address X is also used as an input signal value for the purpose of filling the LUT 202 (The value stored in the LUT at address X is the gamma function value for an input signal value of X). Subtractor 320 receives the address X signal and subtracts the desired black level value BL from it, forming difference signal 322. Subtractor 330 receives the white level WL and black level BL signals and forms the difference signal 338.

A hardware divider 340 divides the value of difference signal 322 by the value of difference signal 338, forming a normalized input signal value 342. A logarithm device 344, which may include a RAM LUT, determines the logarithm 346 of the normalized input signal 342. The logarithm 346 is provided to multiplier 348, which multiplies signal 346 by the gamma exponent 350, forming signal 352. Signal 352 is provided to an exponential function device 354, which may include a RAM LUT. The output signal 356 of the device 354 is provided to multiplier 358, which multiplies signal 356 by the number of quantization levels 360. Since the number of quantization levels is a power of two, the multiplier may be implemented as a fixed shift of the data values to more significant bit positions.

The output signal from multiplier 358 is a data value for the transfer function, which is provided to the LUT 202 and the microprocessor 380. As described with reference to FIG. 1, the address and gamma curve data values are provided to the LUT 202 simultaneously when the LUT is being filled.

Once the gamma curve data is entered into the LUT 202, the microprocessor 380 generates a signal 210 to configure the multiplexer 204 to receive data from the video input channel 216. The gamma correction circuitry 120 is ready for processing video input signals. The $R_b$, $G_b$, and $B_b$ light input signal values from the color correction circuitry 118 are provided by the multiplexer to the LUT 202, which generates signals representing the gamma corrected values and provides these signals to the delay circuitry 122.

Figure 3B:
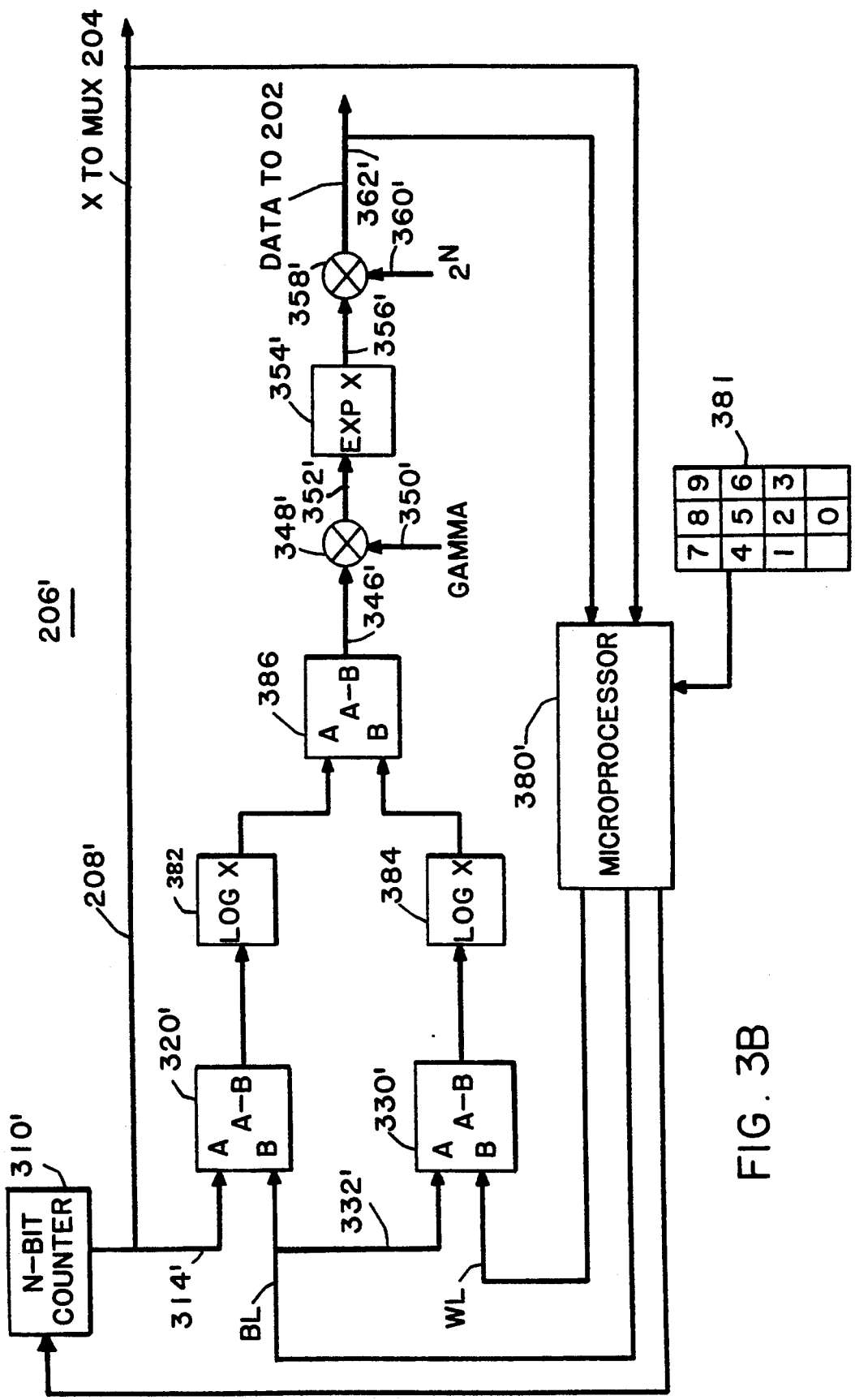
FIG. 3b is a block diagram of an alternative exemplary control logic circuit suitable for use in the gamma correction circuit shown in FIG. 2.

FIG. 3B shows an alternate hardware implementation for the gamma curve data generation function. Most of the hardware elements are the same and are indicated in FIG. 3B by primed (') reference numerals. The hardware divider 340 and the logarithm device 344 are replaced with two logarithm devices 382, 384 and a subtractor 386. It is understood by one skilled in the art that this circuit yields the same result as the circuit shown in FIG. 3a.

In addition to computing the full set of gamma curve values, the circuit elements described in FIG. 3A (or FIG. 3B) are also used to perform portions of the gain limiting function, in cooperation with the microprocessor 380. The circuit elements are used during an iterative process to generate a gain limited gamma curve.

An advantageous feature of the present invention is the generation of a gain limited transfer function during the camera alignment process. The process of generating the transfer function may be adjusted by the operator to provide a unique lighting condition specific transfer function for each unique combination of black level, white level, gamma exponent, and count of possible input values.

FIG. 4 shows an example of a gamma curve 402 based solely on a power curve, with a non-zero black level, and a white level beyond which the signal is clipped, as defined by equation (3).

$$V = \left[ \frac{(X - BL)}{(WL - BL)} \right]^{gamma} * 2^N \quad BL \leq X \leq WL \qquad (3)$$

where:
V = Output signal after gamma correction;
X = Input signal level such that Black level $\leq$ X $\leq$ White level;
BL = Black level
WL = White level
gamma = An exponent, typically about 0.45
N = Number of bits of quantization for X and V FIG. 4 also shows the gain limited gamma curve (function) 404 generated by an exemplary apparatus in accordance with the present invention. The gain limited gamma curve 404 has the same black level value and white level value as gamma curve 402. Unlike curve 402, the gain limited gamma curve 404 is linear in the region 404a between the desired black level and a selected input signal value 408. The gain throughout this linear region is defined by a linear gamma function which is equal to a gain limit value GL provided by the microprocessor 380. The gain in the non-linear region 404b (between the selected input signal value and the white level) of curve 404 decreases from the gain limit value at a decreasing rate according to a power curve having the same gamma exponent value as used to generate curve 402. Gain limited gamma curve 404 is substantially continuous and has a substantially continuous derivative throughout its range. A small discontinuity may be present at the point 404c where the linear and non-linear regions of the gamma curve 404 meet, due to the use of numerical methods to generate the non-linear curve. The size of this discontinuity is limited by the selection of a convergence threshold. This ensures that no significant artifacts are introduced by the use of the gain limited gamma curve.

Because the slope of the gain limited gamma curve 404 is substantially lower than the slope of gamma curve 402 near the black level, noise in the reproduced image is less visible when the gain limited transfer function 404 is used than it would be if the curve 402 were used.

In order to construct the non-linear portion of the gain limited transfer function 404, a transfer function is generated in the form of equation (3), except that a modified black level MBL is substituted for the desired black level BL. A portion 404d of this curve (shown in phantom), between the desired black level and the selected input value 408, is replaced by the linear portion 404a, once the modified black level MBL is determined by the microprocessor 380, as explained in detail with reference to FIG. 5.

Figure 5:
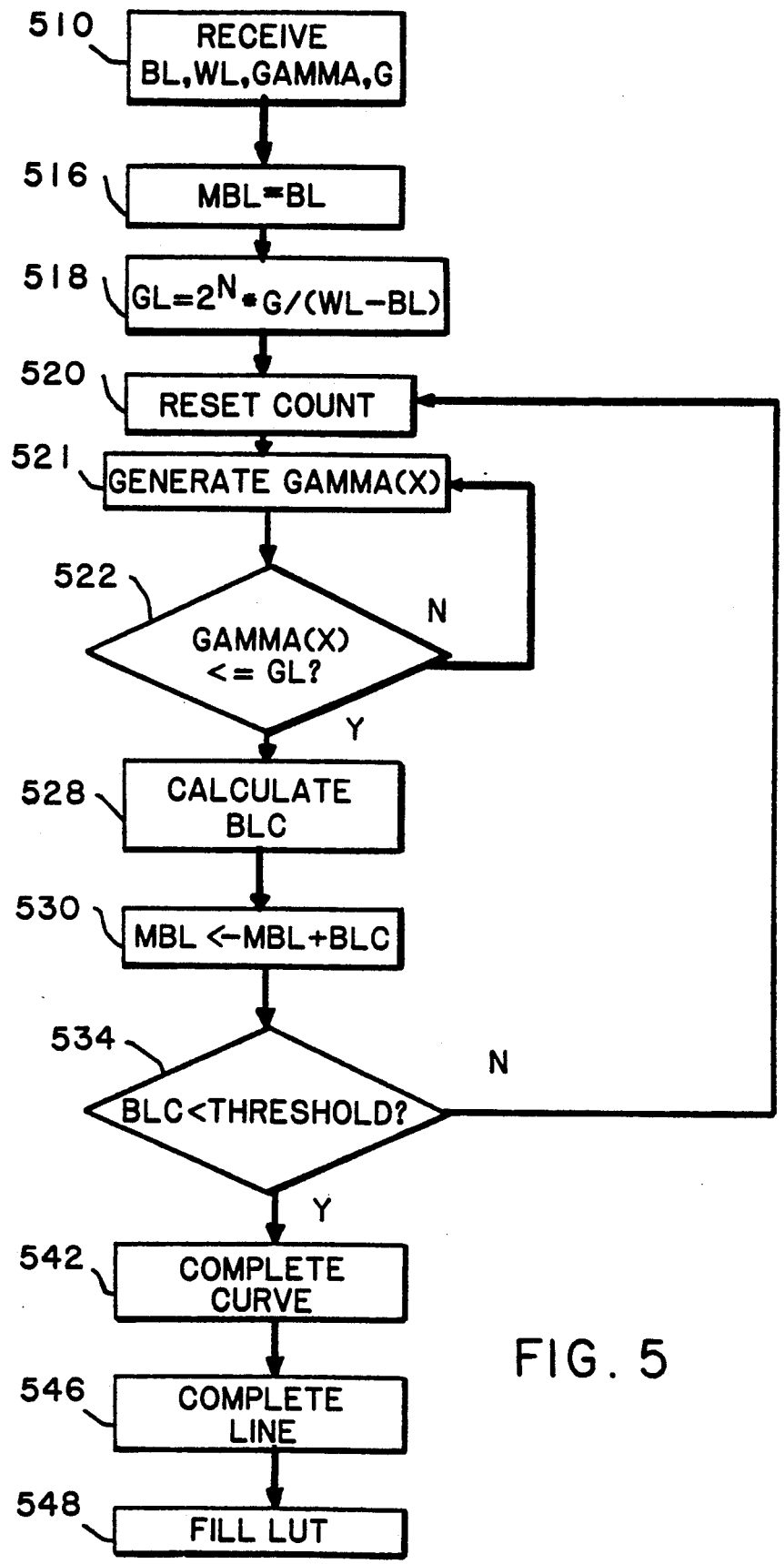
FIG. 5 shows a flow chart diagram of an exemplary method for generating the composite gamma curve.

FIG. 5 is a flow chart showing the steps by which the modified black level is determined by microprocessor 380 and the gain limited transfer function is generated. At step 510, the microprocessor 380 receives the BL, WL, gamma and desired maximum gain value G, WL, BL and G are determined by the operator and may be modified during the color balance process. Gamma will typically be stored in memory. At step 516, the modified black level MBL is set to an initial value equal to BL. At step 518, a gain limit value GL is calculated. The inventors have determined that the visibility of noise is substantially reduced near the black level when a gain limit, GL, in accordance with equation (4) is used.

$$GL = G * 2^N / (WL - BL) \quad (4)$$

The gain limit value is directly proportional to the count of possible input signal values and inversely proportional to the difference value generated by subtracting the black level from the white level.

The remaining computations in the gain limited transfer function generation process are directed at determining a modified black level which is used in the transfer function calculation. The MBL must be chosen so that the gain limited transfer function is substantially continuous and has a substantially continuous derivative at point 404c (as shown in FIG. 4); i.e., the gain of the non-linear gamma function substantially equals the gain limit value at the selected input signal value for which the linear and non-linear gamma functions have substantially equal values. Once MBL is determined, the entire gain limited curve is generated.

The inventors have determined that the following iterative method may be used to generate a suitable MBL. At step 520, the microprocessor 380 provides the counter 310 (as shown in FIG. 3a) with a signal which causes the counter to reset to zero and start counting. At step 521, successive gamma function values are generated in accordance with equation (3), except that the MBL is substituted for BL, thereby forming a non-linear gamma function having a respective modified black level. At step 522, the microprocessor 380 receives successive input 208 and gamma curve signals 362 from the counter 310 and multiplier 358, respectively and compares the gain applied to each signal with the gain limit GL.

As each pair of signals 208, 362 is received, the signal values are stored, along with the values from the last previous pair of received signals. The gain is determined by the ratio of the output signal change to the input signal change for successive signal pairs. Thus, the actual maximum gamma gain in the generated gamma functions may differ from the gain limit value GL. If a typical gamma exponent value is used, the actual maximum value of the gamma gain may equal or exceed the desired maximum gain value (nominally five), and one or more gamma function values may have associated gain values which exceed the value of GL. This will also be true if the gamma exponent value is greater than its nominal value.

When the first calculated gamma curve signal 362 value with gain less than or equal to GL is received, the microprocessor proceeds to step 528. The input signal 208 thus stored is referred to hereinafter as "the selected input signal value (SISV)" and the corresponding calculated gamma function signal 362 value is referred to as the "selected output signal value (SOSV)."

The gain applied to SISV is approximated by equation (5).

$$Gain_{SISV} = (SOSV - G_{i-1}) / (SISV - I_{i-1}) \quad (5)$$

where:
$G_{i-1}$ = The gamma curve value from the last previous signal pair
$I_{i-1}$ = The input signal value from the last previous signal pair
$Gain_{SISV}$ = The gain applied to the selected input signal $_{SISV}$ At step 528, a black level correction factor (BLC) is then calculated from equation (6).

$$BLC = BL - [SISV - (SOSV / GAIN_{SISV})] \quad (6)$$

At step 530, the microprocessor adds BLC to MBL increasing the modified black level MBL. At step 534, a convergence test is performed to determine whether BLC has decreased to a value below a predetermined threshold value.

At step 534, if BLC has not decreased to a value below the predetermined threshold value, it is necessary to repeat steps 520 through 534, thereby generating a plurality of non-linear gamma functions.

At step 534, if BLC has decreased to a value below the predetermined threshold value, then the microprocessor 530 does not reset counter 310, thereby selecting one of the non-linear gamma functions. At step 542, the control logic 206 continues to fill in the LUT 202 (shown in FIG. 2) with the gain limited gamma function values to form the non-linear section 404b of gamma curve 404.

At step 546, when the non-linear section of the gain limited gamma function has been completely stored in the lookup table, the microprocessor calculates the gamma function values for the linear section of the LUT 202, using equation (7).

$$V = GL * (X - BL) \quad BL \leq X \leq SISV \quad (7)$$

At step 548, the remainder of the LUT 202 is filled. The gamma function values are set to 0 for all input signal values less than or equal to BL, and the gamma function values are set to the peak white value for values greater than or equal to WL.

A gain limited gamma function is thus defined, having values which equal the vlaues of the selected non-linear gamma function for input signals with values greater than the selected input signal value, and having values equal to the values of the linear gamma function for input signal values between the black level and the selected input signal value.

In place of steps 520 and 522, an alternative method for finding the SISV is to employ a formula for the gain of the gamma function. It is understood by one skilled in the art that this function (i.e., the slope of the gamma curve) may be obtained by determining the derivative of equation (3) with respect to X, forming equation (8).

$$V' = \frac{gamma}{WL - BL} \cdot \left[ \frac{(X - BL)}{(WL - BL)} \right]^{gamma-1} \cdot 2^N \quad (8)$$

$$BL \leq X \leq WL$$

where V' is the slope of the gamma curve.

Instead of iteratively computing the gain at each point and comparing the result to GL, the gain defined by equation (8) is set equal to GL and the equation is solved to find X. The result may readily be coded into software in microprocessor 380.

It is understood by one skilled in the art that many variations of the embodiments described herein are contemplated. The calculations and decisions which are performed in the microprocessor can also be performed by adding further dedicated hardware components to match the functions shown in FIG. 5. Similarly, it is understood that the functions performed by the hardware components in FIGS. 3a and 3b can be performed by software operating in the microprocessor 380.

While the invention has been described in terms of exemplary embodiments, it is contemplated that it may be practiced as outlined above with modifications within the spirit and scope of the appended claims.

We claim:

1. A method for reducing the maximum gain applied to an input video signal during gamma correction in a camera having a black level, a white level, a gamma exponent value, a desired maximum gain value and a count of possible input signal values, the method comprising the steps of:
   a) calculating a gain limit value from the black level, the white level, the desired maximum gain value and the count;
   b) generating a linear gamma function having a gain which equals said gain limit value;
   c) generating a plurality of non-linear gamma functions having respective modified black levels;
   d) selecting one of said non-linear gamma functions having a gain which substantially equals the gain limit value at a selected input signal value for which said linear and non-linear gamma functions have substantially equal values;
   e) defining a gain limited gamma function having values which equal the values of the selected non-linear gamma function for input signals with values greater than the selected input signal value, and having values equal to the values of the linear gamma function for input signal values between the black level and the selected input signal value; and
   f) applying gamma correction to said video signal using the values in said gain limited gamma function to obtain a gamma corrected video signal.

2. A method for reducing the maximum gain applied to an input video signal during gamma correction, in a camera having a black level, a white level, a gamma exponent value, a desired maximum gain value and a count of possible input signal values, the method comprising the steps of:
   a) assigning a value to a modified black level which is equal to he black level;
   b) calculating a gain limit value from the black level, the white level, the desired maximum gain value and the count;
   c) calculating a selected input signal value for which the gain applied according to the gamma exponent value equals said gain limit value, and calculating a respective selected output signal value;
   d) calculating a black level correction factor which depends on the black level, the selected input signal value, selected output signal value and the gain limit value;
   e) increasing said modified black level by said black level correction factor;
   f) repeating steps (c) through (e) until said black level correction factor decreases to a value less than a predetermined threshold value;
   g) generating gamma correction factors which increase linearly and have gain equal to said gain limit value for video signal values between said black level and said selected input signal value said gamma correction factors increasing non-linearly at a decreasing rate between said selected input signal value and said white level; and
   h) applying sad gamma correction factors to said video signal.

3. A method in accordance with claim 2, in which said gain limit value is directly proportional to said count of possible input signal values.

4. A method in accordance with claim 2, in which said gain limit value is inversely proportional to a difference value generated by subtracting said black level from said white level.

5. A method in accordance with claim 2, in which step (b) comprises the steps of:
   subtracting the black level from the white level to form a difference value;
   determining sad count of possible input signal values;
   dividing said count by said difference value to form a quotient value; and
   multiplying said quotient value by said desired maximum gain value, to generate said gain limit value.

6. A method in accordance with claim 2, in which step (d) comprises the steps of:
   dividing said selected output signal value by said gain limit value to form a quotient value;
   subtracting said quotient from said selected iput signal value to form a difference value; and
   subtracting said difference value from said black level value, to produce said black level correction factor.

7. Apparatus for reducing the maximum gain applied to an input video signal during gamma correction in a camera having a black level, a white level, a gamma exponent value, a desired maximum gain value and a count of possible input signal values, the apparatus comprising:

a) means for calculating a gain limit value from the black level, the white level, the desired maximum gain value and the count;
  b) means for generating a linear gamma function having a gain which equals said gain limit value;
  c) means for generating a plurality of non-linear gamma functions with respectively modified black levels;
  d) means for selecting one of said non-linear gamma functions having a gain which substantially equals the gain limit value at a selected input signal value for which the linear gamma function and the non-linear gamma function have substantially equal values;
  e) means for defining a gain limited gamma function having values which equal the values of the selected non-linear gamma function for input signal values greater than said selected input signal value, and having values equal the values of the linear gamma function for input signal values between the black level and the selected input signal value; and
  f) means for applying gamma correction to said input video signal using the values in said gain limited gamma function to obtain a gamma corrected output video signal.

8. Apparatus for reducing the maximum gain applied to an input video signal during gamma correction, in a camera having a black level, a white level, a gamma exponent value, a desired maximum gain value and a count of possible input signal values, the apparatus comprising:

a) means for assigning a value to a modified black level which is equal to the black level;
  b) means for calculating a gain limit value from the black level, the white level, the desired maximum gain value and the count;
  c) means for calculating a selected input signal value for which the gain applied according to the gamma exponent value equals said gain limit value, and for calculating a respective selected output signal value;
  d) means for calculating a black level correction factor from the black level, the selected input signal value, selected output signal value and the gain limit value;
  e) means for increasing said modified black level by said black level correction factor;
  f) means for comparing said black level correction factor to a predetermined threshold value;
  g) means for iteratively generating said selected input signal value, selected output signal value, black level correction factor and increased modified black level and for comparing said black level correction actor to said threshold value, until said black level correction facto decreases to a value less than said predetermined threshold value;
  h) means for calculating gamma correction factors which increase linearly and have gain equal to said gain limit value for video signal values between said black level and said selected input signal value, said gamma correction factors increasing non-linearly at a decreasing rate between said selected input signal value and said white level; and
  i) means for applying said gamma correction factors to said video signal to obtain a gamma corrected video signal.

* * * * *